United States Patent
Yamamoto et al.

(10) Patent No.: US 7,988,353 B2
(45) Date of Patent: Aug. 2, 2011

(54) ELECTRIC THERMOMETER

(75) Inventors: Tetsuya Yamamoto, Saitama (JP); Isamu Kobayashi, Tokyo (JP)

(73) Assignee: Citizen Holdings Co., Ltd., Nishitokyo-shi, Tokyo (JP)

( * ) Notice: Subject to any disclaimer, the term of this patent is extended or adjusted under 35 U.S.C. 154(b) by 188 days.

(21) Appl. No.: 11/910,220

(22) PCT Filed: Feb. 14, 2006

(86) PCT No.: PCT/JP2006/302495
§ 371 (c)(1),
(2), (4) Date: Sep. 28, 2007

(87) PCT Pub. No.: WO2006/112117
PCT Pub. Date: Oct. 26, 2006

(65) Prior Publication Data
US 2009/0022202 A1    Jan. 22, 2009

(30) Foreign Application Priority Data
Mar. 30, 2005    (JP) ................................. 2005-096885

(51) Int. Cl.
*G01K 7/00* (2006.01)
*G01K 7/21* (2006.01)
*G01K 3/00* (2006.01)

(52) U.S. Cl. ........ 374/163; 374/183; 374/100; 374/104; 374/134; 600/574

(58) Field of Classification Search .................. 374/100, 374/101, 102, 163, 183, 185, 170, 134; 600/674, 600/549, 474
See application file for complete search history.

(56) References Cited

U.S. PATENT DOCUMENTS

| 4,877,333 A | * | 10/1989 | Ota et al. ...................... 374/169 |
| 5,655,305 A | * | 8/1997 | Fletcher ........................ 374/170 |
| 5,738,441 A | * | 4/1998 | Cambridge et al. .......... 374/102 |

(Continued)

FOREIGN PATENT DOCUMENTS
JP    5951319 A    3/1984
(Continued)

OTHER PUBLICATIONS

Notification of Transmittal of Translation of the International Preliminary Report on Patentability (Form PCT/IB/338) of International Application No. PCT/JP2006/302495 mailed Oct. 11, 2007 with Forms PCT/IB/326; PCT/IB/373 and PCT/ISA/237.

(Continued)

*Primary Examiner* — Gail Verbitsky
(74) *Attorney, Agent, or Firm* — Westerman, Hattori, Daniels & Adrian, LLP

(57) ABSTRACT

An electronic thermometer includes a temperature sensing means for sensing a temperature of a part to be measured, a prediction means fro predicting an equilibrium temperature by using the temperature being sensed, and a temperature display means having a temperature display unit. The temperature display means switches the display of the temperature display unit from the predicted temperature predicted by the prediction means to the actual measured temperature sensed by the temperature sensing means, based on a variation state of a peak of the temperature sensed by the temperature sensing means. Accordingly, a variation in displayed temperature is reduced, when the display switching is performed from the predicted temperature to the actual measured temperature, and a determination of the display switching from the predicted temperature to the actual measured temperature can be achieved by a simple circuit.

1 Claim, 14 Drawing Sheets

U.S. PATENT DOCUMENTS

| | | | |
|---|---|---|---|
| 5,829,878 A * | 11/1998 | Weiss et al. | 374/163 |
| 7,065,431 B2 * | 6/2006 | Patterson et al. | 700/299 |
| 7,366,571 B2 * | 4/2008 | Armstrong | 607/45 |
| 2008/0221826 A1 * | 9/2008 | Johns et al. | 702/130 |
| 2008/0307076 A1 * | 12/2008 | Ewing et al. | 709/220 |

FOREIGN PATENT DOCUMENTS

| | | | |
|---|---|---|---|
| JP | 59146735 U | | 10/1984 |
| JP | 613019 A | | 1/1986 |
| JP | 36101311 A | * | 1/1986 |
| JP | 61017033 A | * | 1/1986 |
| JP | 62179621 A | * | 8/1987 |
| JP | 62184322 A | * | 8/1987 |
| JP | 62190427 A | | 8/1987 |
| JP | 62192625 A | | 8/1987 |
| JP | 08215154 A | * | 8/1996 |
| JP | 2005209973 A | * | 8/2005 |

OTHER PUBLICATIONS

International Search Report of PCT/JP2006/302495, date of mailing Apr. 18, 2006.

\* cited by examiner

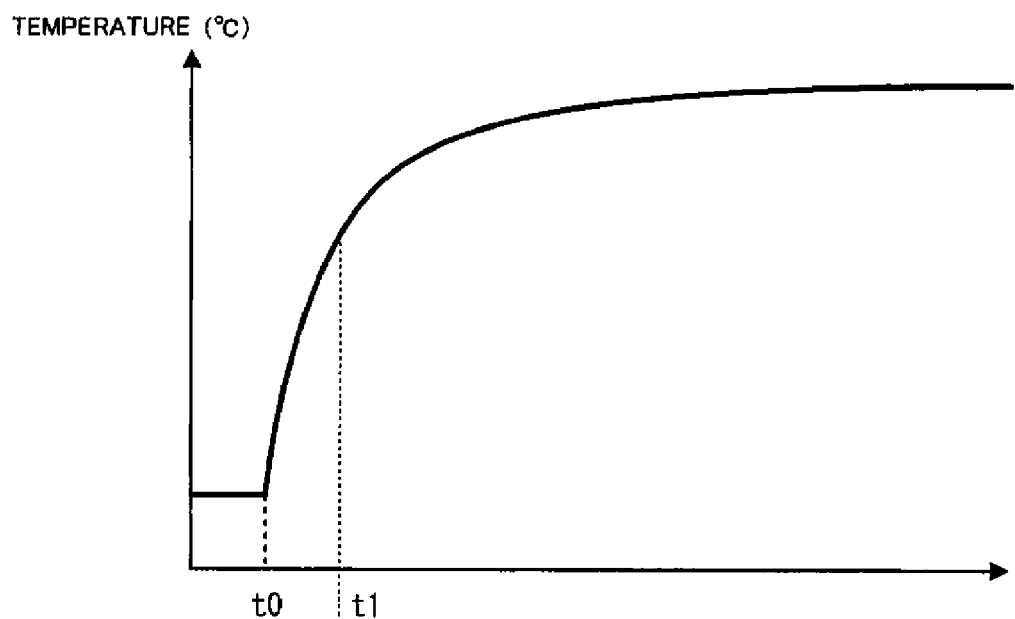
FIG. 3A
TEMPERATURE (°C)
FIG. 3B
MAXIMUM TEMPERATURE VALUE VARIATION
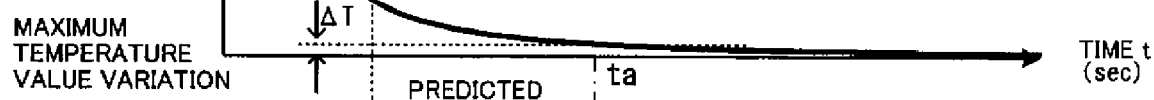
FIG. 3C
TEMPERATURE (°C)
FIG. 3D
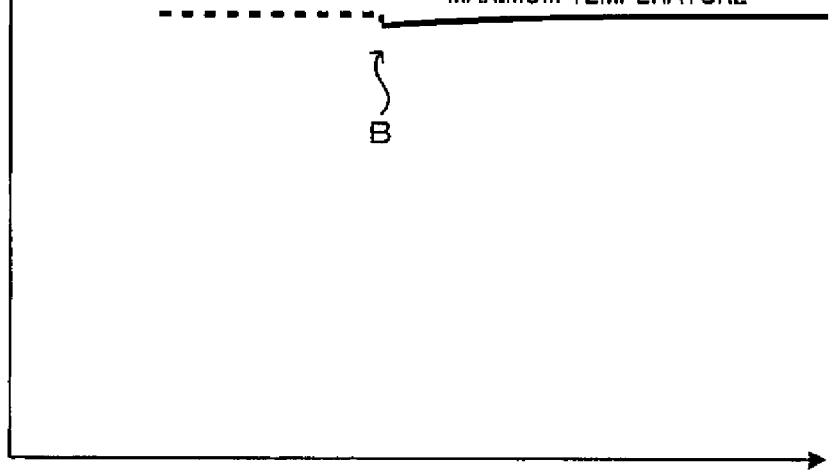

THERMAL EQUILIBRIUM STATE

NON THERMAL EQUILIBRIUM STATE

FIG. 14A
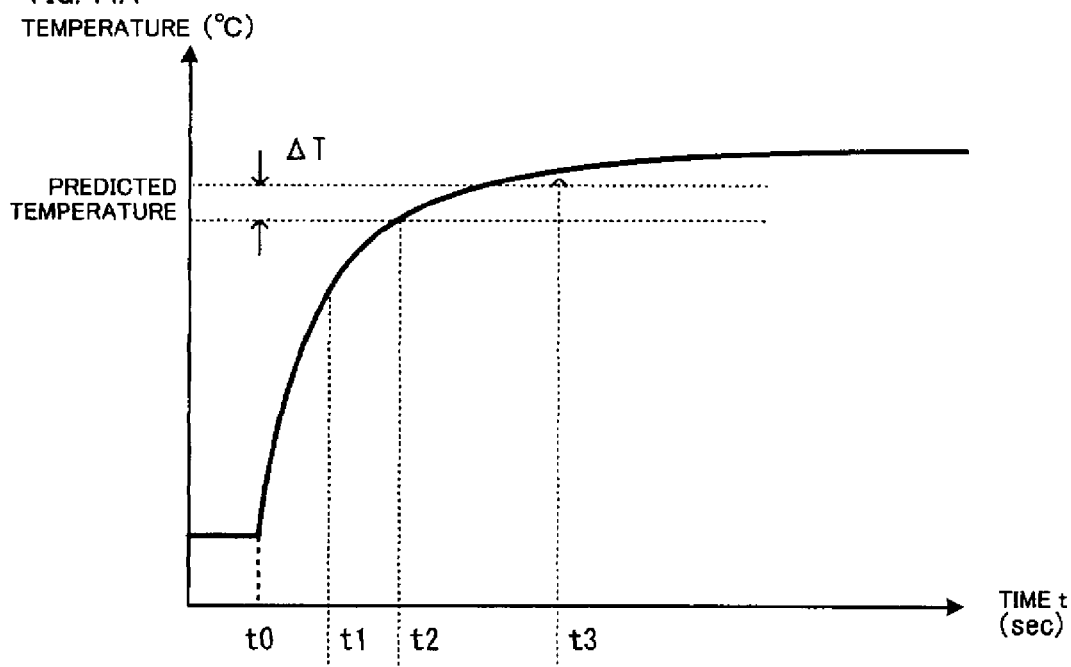
FIG. 14B
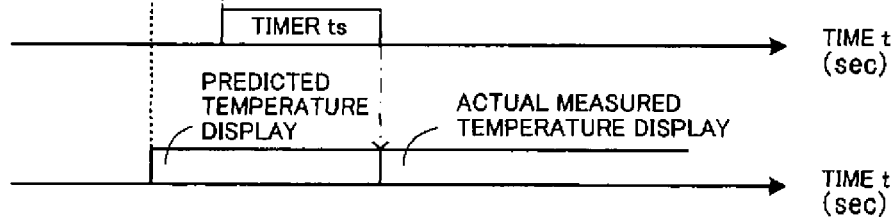
FIG. 14C
FIG. 14D
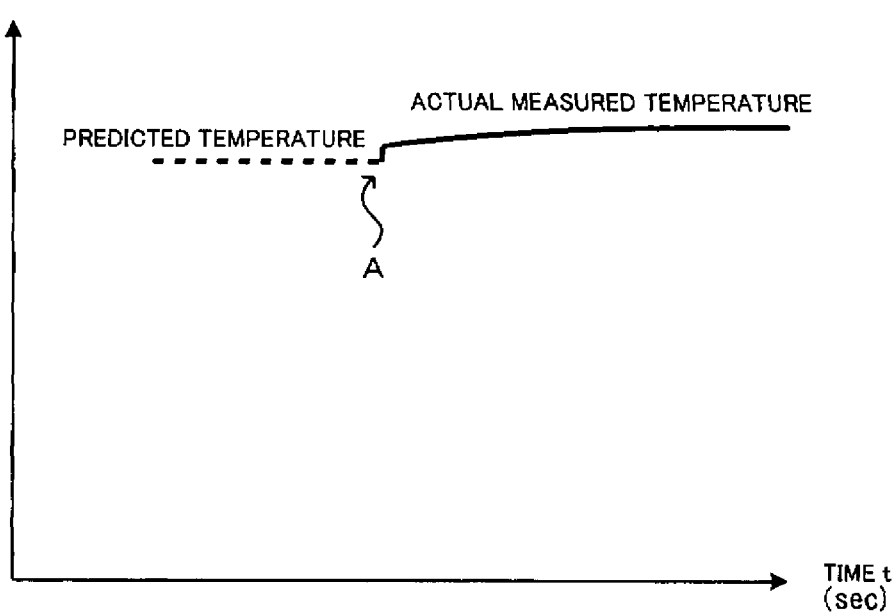

ELECTRIC THERMOMETER

TECHNICAL FIELD

The present invention relates to an electronic thermometer that predicts an equilibrium temperature based on a sensed temperature.

BACKGROUND ART

Generally, a temperature sensor of the electronic thermometer senses a body temperature, a detection signal from this temperature sensor is subjected to a signal processing, and then an actual measured temperature is displayed. Since just after starting the measurement, there is a difference in temperature, between the temperature sensor and the body, it takes time to attain a thermal equilibrium state between the temperature sensor and a part to be measured.

Therefore, in the electronic thermometer, an equilibrium temperature in the thermal equilibrium state is predicted based on a variation in the actual measured temperature. The predicted temperature is sequentially updated and displayed, and thereby reducing the measuring time.

This type of electronic thermometer which predicts an equilibrium temperature switches a display of the predicted temperature to a display of the actual measured temperature, when the actual measured temperature approaches the equilibrium temperature, considering an error between the equilibrium temperature and an actual measured temperature.

If this switching from the predicted temperature display to the actual measured temperature display is performed after a lapse of predetermined period of time from the start of measurement, there is a problem of low reliability, since the display switching may be performed even when the actual measured temperature has not attained the equilibrium temperature yet. In order to solve this problem, there has been proposed an electronic thermometer having a function as the following: A difference value between the actual measured temperature and the predicted temperature, or the rate of increase of the actual measured temperature is obtained, and when this obtained value falls into a predetermined range, a timer is set. Until the time set in the timer is up, the predicted temperature is displayed, and thereafter, the display is switched from the predicted temperature display to the actual measured temperature display (see patent document 1).

Patent document 1: Japanese Unexamined Patent Application Publication No. 62-190427

DISCLOSURE OF THE INVENTION

Problems to be Solved by the Invention

FIG. 12 shows charts to explain the switching operation from the predicted temperature display to the actual measured temperature display. A curved line represented by a solid line in FIG. 12A indicates a temporal change of the actual measured temperature sensed by the temperature sensor. A predicted equilibrium temperature can be calculated, for example, by extracting a predetermined number of values from the actual measured temperature values and applying these values to a prediction formula.

After the measurement is started at the point of time to, the predicted temperature calculated at the point of time t1 is displayed (FIG. 12C). Thereafter, when the actual measured temperature attains a value within a predetermined range of the predicted temperature (time t2), the timer starts timekeeping. At the point of time (time t3) when the predetermined time (ts) is up (FIG. 12B), the predicted temperature display is switched to the actual measured temperature display. FIG. 12D shows a change of the displayed value. When the predicted temperature display is switched to the actual measured value display (point "A" in the figure), the displayed value varies only by a difference between the predicted temperature and the actual measured temperature.

As described above, if the equilibrium state is determined based on a judgment whether or not the difference between the actual measured temperature and the predicted temperature falls into the predetermined range, a change of the displayed value, upon switching from the predicted temperature to the actual measured temperature, is limited to a temperature difference in the predetermined range used for the judgment. Therefore, the display can be switched without bothering the user by uncomfortable feeling.

However, if the predicted temperature is set significantly higher than the actual body temperature, the switching from the predicted temperature to the actual measured temperature is not performed, and the predicted temperature' remains on the display. FIG. 13 shows charts to explain a display state when the predicted temperature is set significantly higher than the actual body temperature.

In FIG. 13A, when the predicted temperature is set significantly higher than the actual body temperature and the actual measured temperature does not fall into a predetermined range of the predicted temperature, the timer does not start timekeeping (FIG. 13B). Therefore, after the predicted temperature is displayed at the point of time t1, the display of the predicted temperature is maintained (FIGS. 13C, D), and the actual measured temperature is not displayed. It is to be noted that in FIG. 13D, the solid line represents the predicted temperature display, and the dotted line represents the actual measured temperature display.

On the other hand, when the predicted temperature is set significantly lower than the actual body temperature, the switching from the predicted temperature to the actual measured temperature is performed before reaching the equilibrium state. FIG. 14 shows charts to explain the display state when the predicted temperature is set significantly lower than the body temperature.

In FIG. 14A, when the predicted temperature is set significantly lower than the actual body temperature, the timer starts timekeeping at the point of time (time t2) that is earlier than the time initially scheduled. In addition, the predetermined time is up before the actual measured temperature attains the equilibrium state (time t3), and the predicted temperature display is switched to the actual measured temperature display (FIG. 14C). FIG. 14D shows a change of the displayed value, and at the point when the predicted temperature display is switched to the actual measured temperature display (A in the figure), the displayed value varies by a difference between the predicted temperature and the actual measured temperature. Since this point has not attained the equilibrium state, the actual measured temperature is changed even after the switching is performed, and the displayed value still varies in accordance with the actual measured temperature. It is to be noted that in FIG. 14D, the dotted line represents the predicted temperature display, and the solid line represents the actual measured temperature display.

If the equilibrium state is determined based on a judgment whether or not the increase rate of the actual measured temperature falls into a predetermined range, following problems may be overcome, which are caused by the predicted temperature largely deviated from the actual body temperature: switching from the predicted temperature to the actual measured temperature is not performed; and the displayed value drastically varies due to a substantial change of the actual measured temperature even after the switching. However, if the equilibrium state is determined based on the judgment whether or not the increase rate of the actual measured temperature falls into a predetermined range, there is a problem as the following: if the increase rate of the actual measured temperature is lowered in the case such as when the temperature sensor separates from the part to be measured just for a moment, or when the thermal transfer rate is deteriorated due to some reasons, an erroneous judgment may be made that the state has not been stable yet, even though it is once determined that the state is approaching the thermal equilibrium. Consequently, it may end up resetting the timer. On this occasion, even though the state has already attained the thermal equilibrium, it is determined that the state is not stable yet, and therefore the user is forced to keep measuring for a period of time longer than necessary.

As described above, in the conventional electronic thermometer which determines the switching of display from the predicted temperature to the actual measured temperature, by a difference between the actual measured temperature and the predicted temperature, there is a problem that a determination when the display is switched is unstable, and the displayed temperature may be substantially changed after the switching of the display.

Furthermore, in the electronic thermometer which determines the switching of display by the increase rate of the actual measured temperature, there is a problem that a measuring time may be spent longer than necessary.

There is another problem that in order to calculate the difference between the actual measured temperature value and the predicted temperature value, and in order to calculate the increase rate of the actual measured temperature, a complicated circuit configuration is required.

In view of the situations above, an object of the present invention is to solve the conventional problems, by achieving a stable determination of display switching from the predicted temperature to the actual measured temperature and reducing the variation of displayed temperature after the display is switched. Another object of the present invention is to make a determination of display switching, in a simply configured circuit.

Means to Solve the Problems

The electronic thermometer according to the present invention includes a temperature sensing means for sensing a temperature of a part to be measured, a prediction means for predicting an equilibrium temperature by using the temperature having been sensed by the temperature sensing means, and a temperature display means having a temperature display unit.

The temperature display means switches a temperature displayed on the temperature display unit, from a display of the predicted temperature based on the equilibrium temperature predicted by the prediction means to a display of the actual measured temperature sensed by the temperature sensing means. This switching of the temperature display is performed based on a peak state of the temperature sensed by the temperature sensing means. More specifically, when an increase rate of a peak hold value of the sensed temperature becomes equal to or less than a predetermined value, the display on the temperature display unit is switched from the predicted temperature to the actual measured temperature.

In a normal measurement, the peak hold value of the sensed temperature and the actual measured temperature at this point of time are the same. Therefore, by switching the display from the predicted temperature to the actual measured temperature based on a rising state of the peak hold value of the sensed temperature, the determination of display switching from the predicted temperature to the actual measured temperature can be stabilized, and a variation in the displayed temperature after the display switching can be reduced.

Since the peak hold value of the sensed temperature can be implemented by a simple peak hold circuit, the determination of display switching can be implemented by a simple circuit configuration.

The electronic thermometer according to the present invention includes a temperature sensing means for sensing a temperature of a part to be measured, a maximum temperature value storing means for storing a maximum temperature value of the sensed temperature, a prediction means for predicting an equilibrium temperature using the temperature being sensed, and the temperature display means having the temperature display unit.

The temperature display means switches a display of the temperature display unit from the display of the equilibrium temperature predicted by the prediction means to the display of the maximum temperature value stored in the maximum temperature value storing means, based on an update state of the maximum temperature value stored in the maximum temperature value storing means.

In particular, the temperature display means switches the display of the temperature display unit, from the display of the equilibrium temperature predicted by the prediction means to the display of the maximum temperature value stored in the maximum temperature value storing means, when there is no change for a predetermined period of time, in the maximum temperature value stored in the maximum temperature value storing means.

The temperature sensing means senses a temperature of the part to be measured by a generally used temperature sensor and the like.

The maximum temperature value storing means sequentially updates and stores the maximum temperature value as to the temperature sensed by the temperature sensing means. In the temporal change of the sensed temperature, if a new maximum temperature value is detected, the maximum temperature value being stored is updated. Even when the sensed temperature is lowered after the maximum temperature value is stored, the maximum temperature value is held without being updated. Therefore, the maximum temperature value stored in the maximum temperature value storing means is the maximum value in the measurement, among the values having been obtained up to the measuring point. The maximum temperature value obtained at this measuring point is the closet value to the temperature attained in the thermal equilibrium state, in measuring the part to be measured.

The electronic thermometer according to the present invention switches the display of the temperature display unit from the display of the equilibrium temperature predicted by the prediction means to the display of the maximum temperature value stored in the maximum temperature value storing means. Here, the maximum temperature value storing means does not update the maximum temperature value, even when the actual measured temperature is lowered due to a reason such as separating of the temperature sensing means from the part to be measured. Therefore, according to the electronic thermometer of the present invention, the maximum temperature value is maintained even when the actual measured value is lowered, and therefore, avoiding a situation that the user is forced to measure the temperature for a time longer than necessary.

Generally, the maximum temperature is an actual measured temperature. Switching of the display of the temperature display unit, from the display of the equilibrium temperature predicted by the prediction means to the display of the actual measured temperature, is performed by using only the actual measured temperature that is the maximum temperature value, instead of using the elements such as the difference between the actual measured temperature value and the predicted temperature value, and the increase rate of the actual measured temperature, whereby the circuit configuration is simplified.

Switching of the display of the temperature display unit from the display of equilibrium temperature predicted by the prediction means to the display of the actual measured temperature is performed by using the maximum temperature value, which is a value much closer to a value in the thermal equilibrium state. Therefore, a change in the displayed temperature at the time of the display switching is made smaller. In addition, since the maximum temperature value is displayed after the display switching, variations in the temperature being displayed can be reduced.

It is determined whether or not there has been any change in the maximum temperature value for a predetermined period of time, Just by a simple processing such as comparing the values stored in the maximum temperature value storing means. Therefore, there is no need to have the circuit configuration required for calculation, such as obtaining a difference value between the actual measured temperature and the predicted temperature, and the increase rate of the actual measured temperature.

In one configuration of the electronic thermometer of the present invention, the maximum temperature value storing means stores two maximum temperature values, new and old, placing a predetermined period of time therebetween. A thermal equilibrium determining unit determines whether or not the new maximum temperature value stored in the maximum temperature value storing means exists in the temperature range defined by the old maximum temperature value of the predetermine period of time before, and a temperature value obtained by adding a predetermined temperature to the old maximum temperature value, thereby determining the display switching on the temperature display unit, from the display of the equilibrium temperature predicted by the prediction means to the display of the actual measured temperature.

Effect of the Invention

The electronic thermometer of the present invention performs switching of the display on the temperature display unit, from the display of the equilibrium temperature predicted by the prediction means to the display of the actual measured temperature, based on the rising state of the peak hold value of the temperature sensed by the temperature sensing means. Accordingly, it is possible to stabilize the determination of switching from the predicted temperature to the actual measured temperature, and to reduce the variation in the temperature being displayed after the display is switched. In addition, the peak hold value of the sensed temperature can be obtained by a peak hold circuit having a simple configuration, and therefore the display switching can be determined by a simple circuit configuration.

The electronic thermometer of the present invention determines switching of the display on the temperature display unit, from the display of the equilibrium temperature predicted by the prediction means to the display of the actual measured temperature, based on the update of the maximum temperature value. Accordingly, even when the actual measured temperature is lowered due to a reason such as separating of the temperature sensing means from the part to be measured, the maximum temperature value is not updated, and therefore, it is possible to avoid that the user is forced to measure the temperature for a time longer then necessary.

The electronic thermometer of the present invention performs switching of the display on the temperature display unit, from the display of the equilibrium temperature predicted by the prediction means to the display of the actual measured temperature, just by using the actual measured temperature, which is the maximum temperature value, instead of the elements such as a difference value between the actual measured temperature and the predicted temperature, and the increase rate of the actual measured temperature. Therefore, a circuit to perform those calculations is not necessary, thereby simplifying the circuit configuration.

The electronic thermometer of the present invention can reduce a change of displayed temperature when the display is switched, and variations of the displayed temperature after the display is switched.

BRIEF DESCRIPTION OF THE DRAWINGS

FIG. 3 shows charts to explain an aspect of the electronic thermometer according to the invention, to perform switching the displays, from a display of the predicted temperature to a display of the maximum temperature value (actual measured temperature);

FIG. 14 shows charts to explain a display state where the predicted temperature is set significantly lower than an actual body temperature.

DESCRIPTION OF THE MARKS

1 TEMPERATURE SENSING MEANS
1a TEMPERATURE SENSOR
1b TEMPERATURE MEASURING UNIT
2 PREDICTION MEANS
2a PREDICTION DATA HOLDER
2b PREDICTION ARITHMETIC UNIT
3 STABILITY DETECTION MEANS
3a MAXIMUM VALUE DETECTION UNIT
3b THERMAL EQUILIBRIUM DETERMINATION UNIT
4 MAXIMUM TEMPERATURE VALUE STORING MEANS
4a MAXIMUM VALUE DATA HOLDER
5 DISPLAY MEANS
5a DISPLAY SWITCHING UNIT
5b DISPLAY UNIT
6 BUZZER
7 PREVIOUS VALUE STORING MEANS

BEST MODE FOR CARRYING OUT THE INVENTION

Hereinafter, the electronic thermometer according to the present invention will be explained in detail, with reference to the accompanying drawings.

Figure 1:
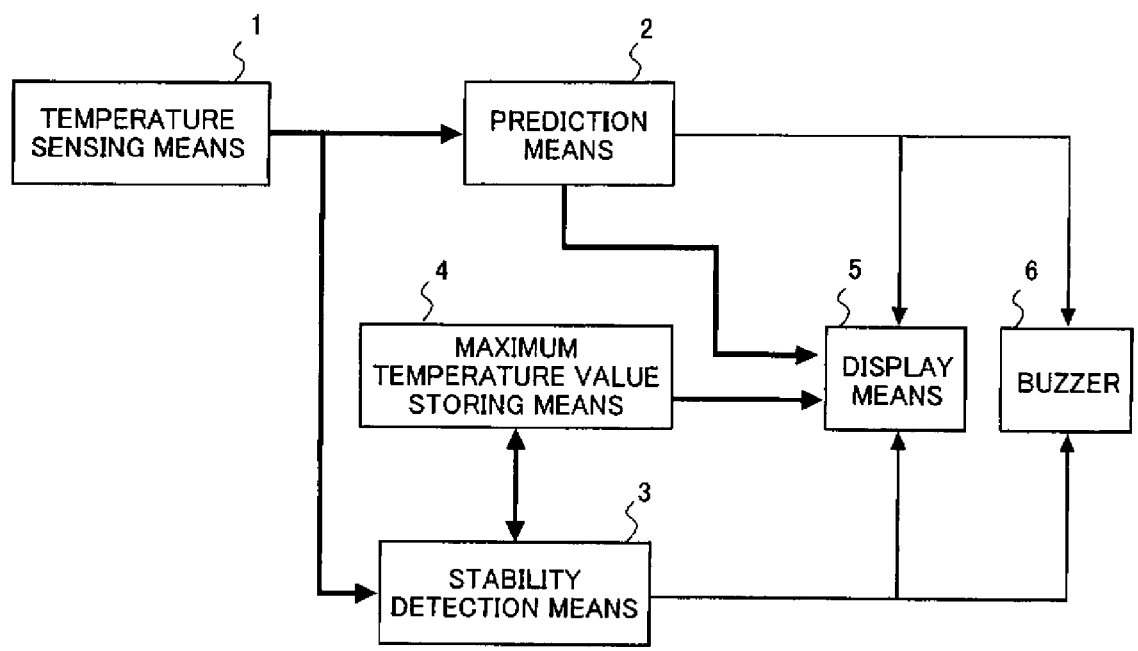
FIG. 1 is a diagram to explain a schematic configuration of an electronic thermometer according to the present invention.

FIG. 1 is a diagram to explain a schematic configuration of the electronic thermometer according to the present invention.

The electronic thermometer includes a temperature sensing means 1 for sensing a temperature of a part to be measured, a maximum temperature value storing means 4 for storing a maximum temperature value of the actual measured temperature sensed by the temperature sensing means 1 and transferring the maximum temperature value being stored to a display means 5, a stability detection means 3 that compares the actual measured value sensed by the temperature sensing means 1 with the maximum temperature value stored in the maximum temperature value storing means 4 for detecting whether or not a temperature rise is stabilized, and outputs a display switching signal to the display means 5 upon attaining a stabile state, a prediction means 2 for calculating a temperature in thermal equilibrium by using the actual measured temperature sensed by the temperature sensing means 1, a display means 5 for displaying the predicted temperature predicted by the prediction means 2 or the maximum temperature value, switching therebetween, and a buzzer 6 for notifying by sound that the predicted temperature is displayed, and the display is switched from the display of predicted temperature to the display of the actual measured temperature such as the maximum temperature value.

The stability detection means 3 provided in the electronic thermometer having the above configuration determines that a state is stable, when the temperature sensing means 1 finds that the state is approaching the thermal equilibrium state, by using the maximum temperature value stored in the maximum temperature value storing means 4. Then, the stability detection means 3 switches the temperature displayed on the display means 5 to the stored maximum temperature value.

Figure 2:
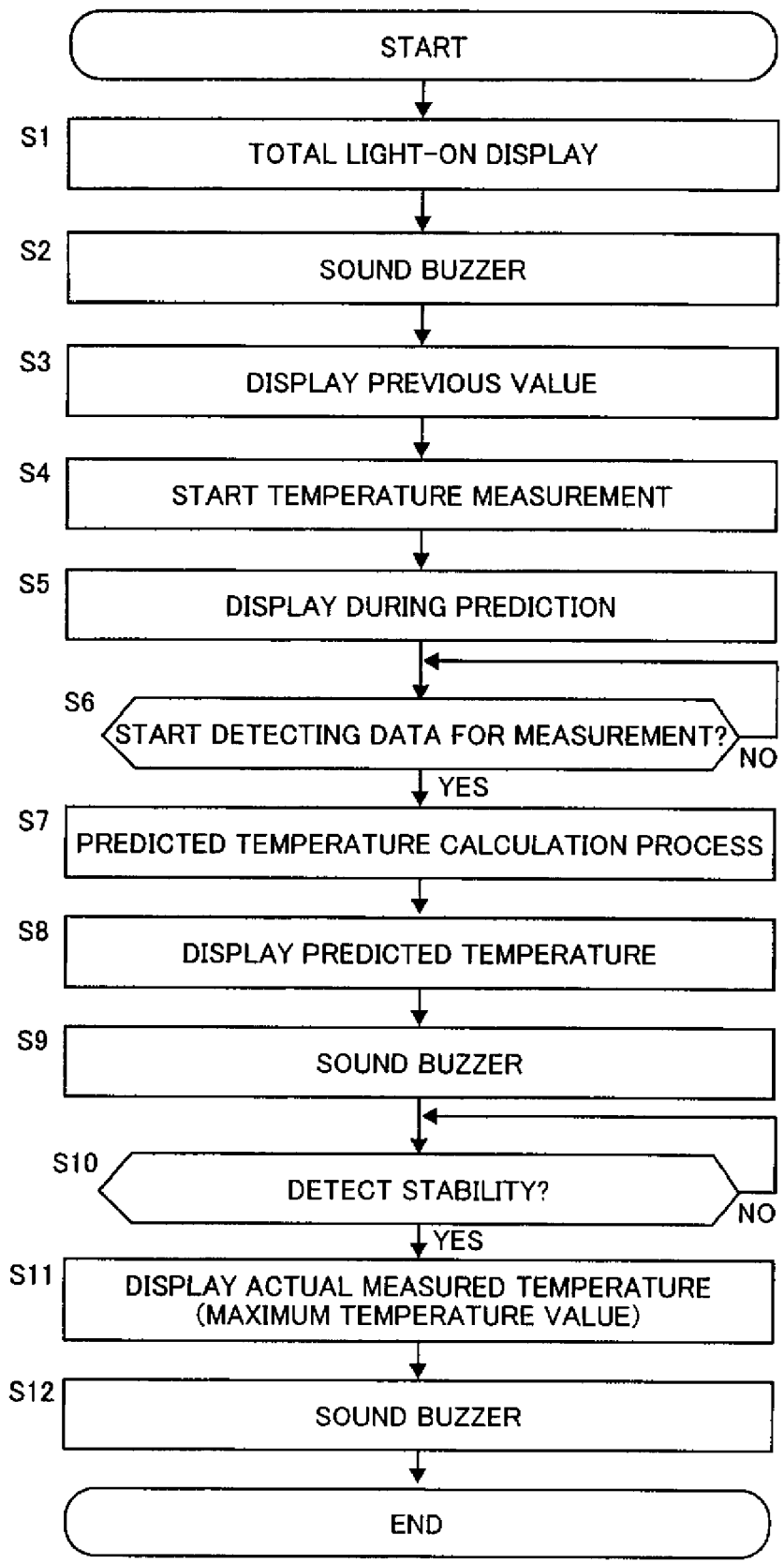
FIG. 2 is a flowchart to explain an operation example of the electronic thermometer according to the present invention.

Hereinafter, with reference to the flowchart shown in FIG. 2, an operation example of the electronic thermometer according to the present invention will be explained. In the following flowchart, each step excluding the steps S10 and S11 may be the same as the operation example of a conventional electronic thermometer that calculates a predicted temperature. A control of each step is exerted by the control means (not illustrated in FIG. 1) constituted from a CPU, a memory storing control programs, and the like.

When the switch of the electronic thermometer is turned ON, by a display operation such as lighting on all the display segments of the display means 5 (S1), and a sound operation by the buzzer, it is displayed that the switch is now in the ON state (S2). It is to be noted here that this total light-on operation is just an example, and another display mode may be applicable. After the total light-on display is carried out, the display means 5 reads and displays the previous measured value stored in a storing means (not illustrated in FIG. 1) (S3).

The temperature sensing means 1 starts measuring the temperature, and transfers the actual measured temperature being sensed to the prediction means 2 and the stability detection means 3 (S4). When the temperature measurement is started, the display means 5 displays that the prediction is being performed now (S5). The prediction means 2 sequentially inputs the actual measured temperature sensed by the temperature sensing means 1, captures the actual measured temperature at a predetermined point of time, as a predictive calculation data item (S6), and then, performs a process for calculating the predicted temperature (S7). It is to be noted here that the number of data items captured as the predictive calculation data and the timing for the capturing can be set in various ways. For example, a first data point is selected based on the rate of temperature increase. Furthermore, points of time each after a lapse of predetermined time from the first point, are selected as the second data point and as the third data point, thereby extracting three predictive calculation data items. Then, these predictive calculation data items are applied to a predetermined calculation formula for prediction, and a predicted temperature is calculated.

The prediction means 2 transfers the predicted temperature calculated in the step S7 to the display means 5. Then, the predicted temperature is displayed (S8) as well as the buzzer 6 is sounded, thereby notifying a user that the predicted temperature is displayed (S9) (predicted temperature display mode).

In sensing the temperature, if the state is entering the thermal equilibrium state, the stability detection means 3 of the electronic thermometer of the present invention detects that the variation of the sensed temperature has attained a stable state (S10), and displays an actual measured temperature by the display means 5 (actual measured temperature display mode). At this timing, the display means 5 displays as the actual measured temperature, the maximum temperature value stored in the maximum temperature value storing means 5 (S11), and by sounding the buzzer 6, the user is notified that now attaining the stable state (S12).

Hereinafter, an aspect of the present invention will be explained with reference to FIG. 3 in which it is determined the state is stable when no more change is found in the maximum temperature value stored in the maximum temperature value storing means 4, and at the point of time when this stability state is detected, the display switching is performed from the display of the predicted temperature to the display of the maximum temperature value (actual measured temperature).

Another aspect of the present invention will be explained with reference to FIG. 4 in which it is determined that the state is stable a situation where no more change is found in the maximum temperature value stored in the maximum temperature value storing means 4 continues for a predetermined period of time, and at the point of time when it is determined that the state is stable, the display switching is performed from the display of the predicted temperature to the display of the maximum temperature value (actual measured temperature).

Firstly, the first aspect of the invention will be explained, in which the display switching from the display of the predicted temperature to the display of the maximum temperature value (actual measured temperature) is performed, when no more change is found in the maximum temperature value.

The curve represented by the solid line in FIG. 3A indicates a temporal change of the actual measured temperature sensed by the temperature sensor. The predicted temperature of equilibrium temperature can be calculated by extracting a predetermined number of values from the actual measured temperature, and applying these values to the prediction formula in the same manner as described above.

After the measurement is started at the time t0, a predicted temperature being calculated at the time t1 is displayed (FIG. 3C). The stability detection means 3 monitors a state how the maximum temperature value is updated, which is stored in the maximum temperature value storing means 4, and determines that the state is entering the thermal equilibrium state, by detecting that an update range falls into a previously set range $\Delta T$.

At this point of time (time ta), the display means 5 switches the temperature to be displayed, from the predicted temperature to the actual measured temperature (maximum temperature value) (FIG. 3C). FIG. 3D shows a change of the displayed value. At the point of time ("B" in the figure) when the predicted temperature display (broken line in the figure) is switched to the actual measured temperature display (solid line in the figure), there is a variation in the displayed value, only by the difference between the predicted temperature and the actual measured temperature (maximum temperature value). Thereafter, the displayed value is changed only when the maximum temperature value is updated.

Next, the second aspect of the invention will be explained, in which the display switching from the display of the predicted temperature to the display of the maximum temperature value (actual measured temperature) is performed, after the situation where no more change is found in the maximum temperature value continues for a predetermined period of time.

Figure 4A:
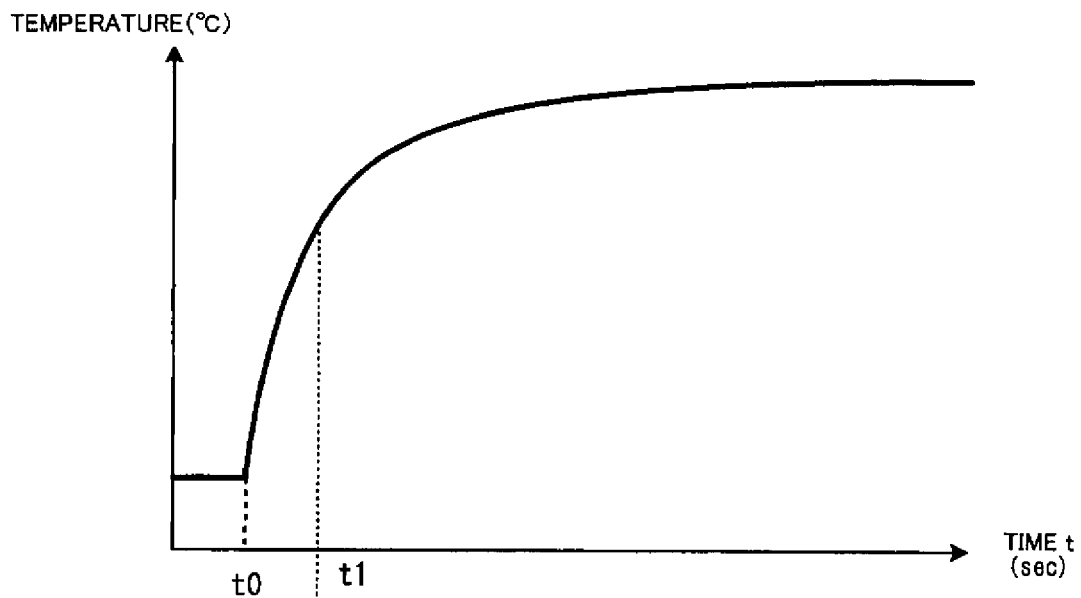
FIG. 4 shows charts to explain another aspect of the electronic thermometer according to the invention, to perform switching the displays, from a display of the predicted temperature to a display of the maximum temperature value (actual measured temperature)
Figure 4B:
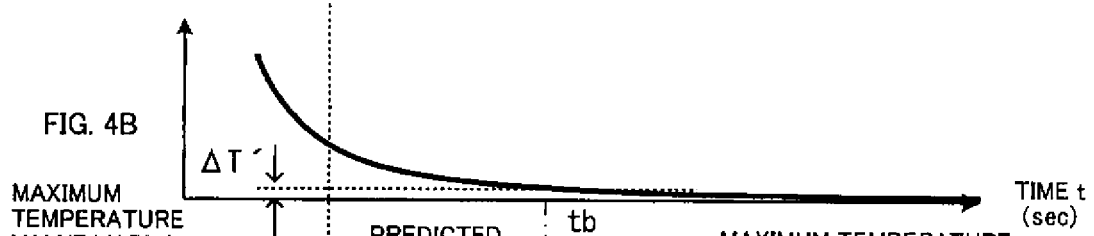

The curve represented by the solid line in FIG. 4A indicates a temporal change of the actual measured temperature sensed by the temperature sensor. The predicted temperature of equilibrium temperature can be calculated by extracting a predetermined number of values from the actual measured temperature, and applying these values to the prediction formula in the same manner as described above.

Figure 4C:
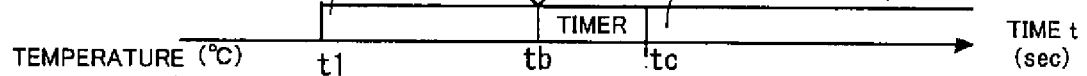

After the measurement is started at time to, the predicted temperature is displayed at time t1 (FIG. 4C). The stability detection means 3 monitors a state how the maximum temperature value is updated, which is stored in the maximum temperature value storing means 4, and starts timekeeping at the time when its update range falls into a previously set range $\Delta T'$, so that a predetermined period of time (ts) is timed. In this predetermined period of time (ts), if the update of the maximum temperature value does not go over the range $\Delta T'$, it is determined now entering the thermal equilibrium state. The display means 5 switches the display from the predicted temperature display to the actual measured temperature (maximum temperature value) display (FIG. 4C) at the point of time (time tc) when a predetermined period of time (ts) is timed from the time tb.

Figure 4D:
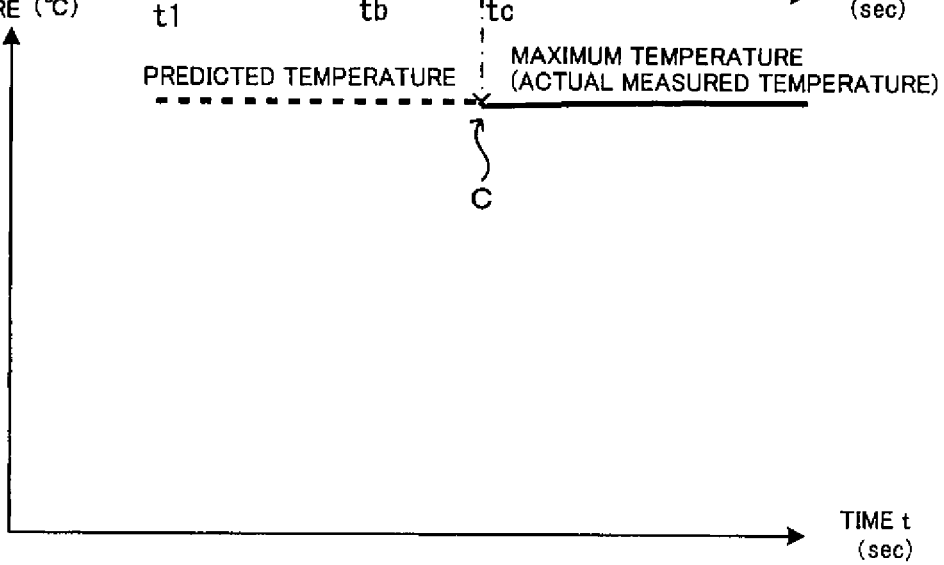

FIG. 4D shows a change of displayed value. At the point of time ("C" in the figure) when the predicted temperature display (broken line in the figure) is switched to the actual measured temperature display (solid line in the figure), there is a variation in the displayed value, only by the difference between the predicted temperature and the actual measured temperature (maximum temperature value). Thereafter, the displayed value is changed only when the maximum temperature value is updated.

It is to be noted here that the set range $\Delta T$ in the aspect of the invention shown in FIG. 3 and the set range $\Delta T'$ in the aspect of the invention shown in FIG. 4 may be the same value or different value. If the set range $\Delta T$ and the set range $\Delta T'$ are the same value, the timing when the display is switched from the predicted temperature to the actual measured temperature (maximum temperature value) becomes later in the case where the timer is used to set the switch timing after a lapse of predetermined period of time. Therefore, in the said case, the variation range at the time of switching becomes smaller. In addition, both the set ranges $\Delta T$ and $\Delta T'$ may be set to zero.

Next, a configuration example of the electronic thermometer according to the present invention will be explained in detail, with reference to FIG. 5.

The temperature sensing means 1 includes a temperature sensor 1a for measuring a temperature of the part to be measured, and a temperature measuring unit 1b that converts a sensed signal outputted from the temperature sensor 1a into a temperature signal, and outputs the converted signal as an actual measured temperature. The temperature measuring unit 1b is provided with an A/D converter, and the actual measured temperature is outputted in a form of digital value.

The prediction means 2 includes a prediction data holder 2a for holding temperature data used for calculating the predicted temperature and elapsed time from the measurement start, and a prediction arithmetic unit 2b for computing and calculating the predicted temperature by using the temperature data held by the prediction data holder 2a. The prediction arithmetic unit 2b is provided with an arithmetic formula to calculate the predicted temperature. The temperature data is applied to this arithmetic formula, thereby calculating the predicted temperature after a lapse of predetermined period of time (for example, 10 minutes later).

The maximum temperature value storing means 4 includes a maximum value data holder 4a for holding a maximum actual measured temperature value of the actual measured temperature, as a maximum temperature value. The maximum value data holder 4a transfers the maximum value data (the maximum temperature value) to the display means 5, when the display is switched to the actual measured temperature display mode, and when the maximum value is updated after the display is switched to the actual measured temperature display mode.

The stability detection means 3 includes a maximum value detection unit 3a and a thermal equilibrium determination unit 3b. The maximum value detection unit 3a compares the actual measured temperature obtained by the temperature sensing means 1 with the maximum temperature value stored in the maximum temperature value storing means 4. When the actual measured temperature is higher than the maximum temperature value being stored, the value stored in the maximum value data holder 4a is updated. Accordingly, the maximum temperature value stored in the maximum temperature value storing means 4 is kept to be the maximum value.

The thermal equilibrium determination unit 3b monitors whether or not the maximum temperature value stored in the maximum value data holder 4a is updated within a predetermined period of time. If it is not updated, or the updated amount is within a predetermined range, it is assumed that there is no update in the maximum temperature value, and then a determination is made that the state is entering the thermal equilibrium state. According to the determination that the state is entering the thermal equilibrium state, the display on the display means 5 is switched from the predicted temperature to the actual measured temperature (maximum temperature value).

Figure 7:
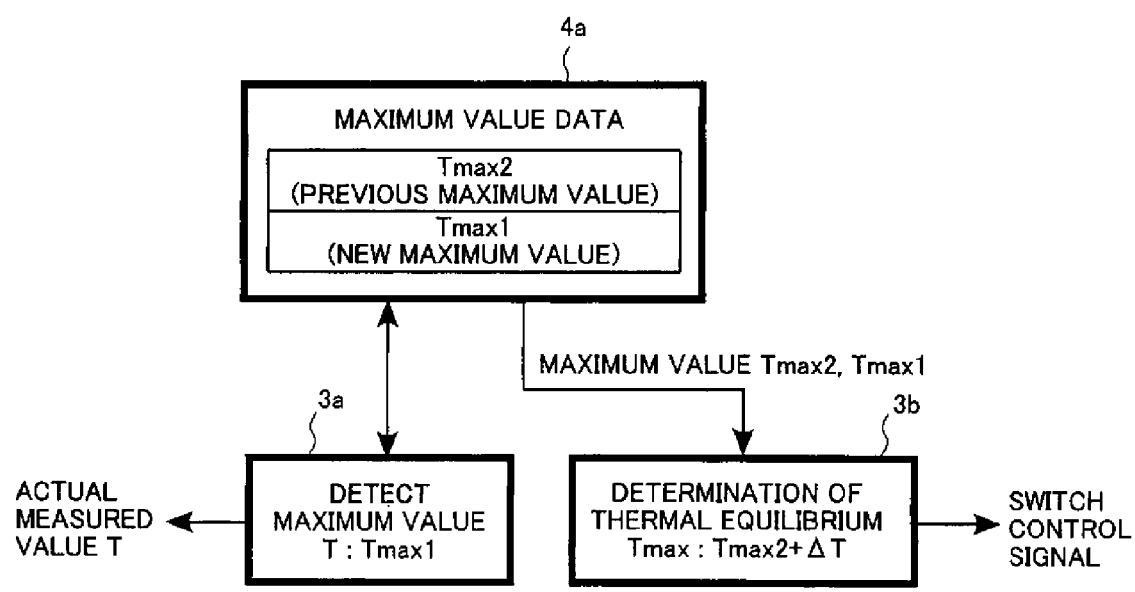
FIG. 7 is an illustration to explain an operation example of the stability detection means according to the present invention.
Figure 8A:
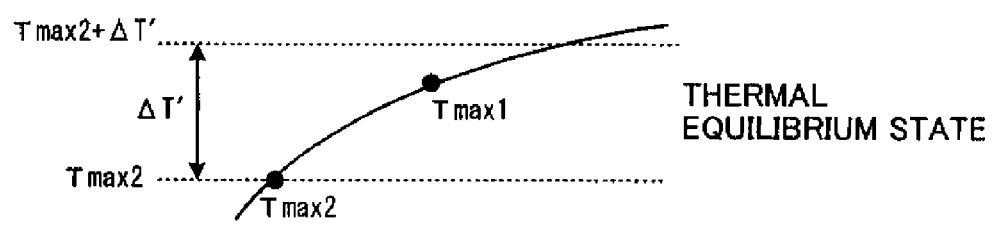
FIG. 8 shows charts illustrating the update of the maximum temperature value, to explain an operation example of the stability detection means according to the present invention.

Hereinafter, an operation example of the stability detection means will be explained with reference to the flowchart shown in FIG. 6, the illustration of FIG. 7, and the charts in FIG. 8 showing the update of the maximum temperature value.

It is to be noted here that the maximum value data holder 4a holds two maximum data items, i.e., a previous maximum value and a new maximum value. The previous maximum value (Tmax2) is a maximum value before updating of the maximum value is performed. The new maximum value (Tmax1) is a maximum value after updating of the maximum value is performed. Therefore, the new maximum value (Tmax1) is always newer maximum value than the previous maximum value (Tmax2), and the new maximum value (Tmax1) is a value larger than the previous maximum value (Tmax2).

Flag MODE for timer setting and timer resetting, which will be described below, is set to zero (S20).

The maximum value detection unit 3a compares a actual measured temperature T inputted form the temperature sensing means 1 (S21), with the new maximum value (Tmax1) read out from the maximum data holder 4a (S22), and updates the maximum value, when the actual measured temperature T is equal to the new maximum value (Tmax1), or the actual measured value T is larger than the new maximum value (Tmax1)(S23). In updating the maximum value, the value of the maximum value (Tmax1) is set to be the previous maximum value (Tmax2), and the actual measured value T substitutes for the value of the new maximum value (Tmax1) (S24). In the step of S23, if the actual measured temperature T is smaller than the new maximum value (Tmax1), the update of the maximum value is not performed, and the operation proceeds to step S25.

Next, the thermal equilibrium determination unit 3b reads from the maximum value data holder 4a, two maximum values, i.e., new maximum value (Tmax1) and previous maximum value (Tmax2), and makes comparisons therebetween (S25).

In the comparison step in S25, it is determined whether or not the update amount from the previous maximum value (Tmax2) to the new maximum value (Tmax1) falls into a predetermined range ($\Delta T$'). If the update amount falls into the predetermined range ($\Delta T$'), it is determined that the state is attaining the thermal equilibrium state.

Figure 8B:
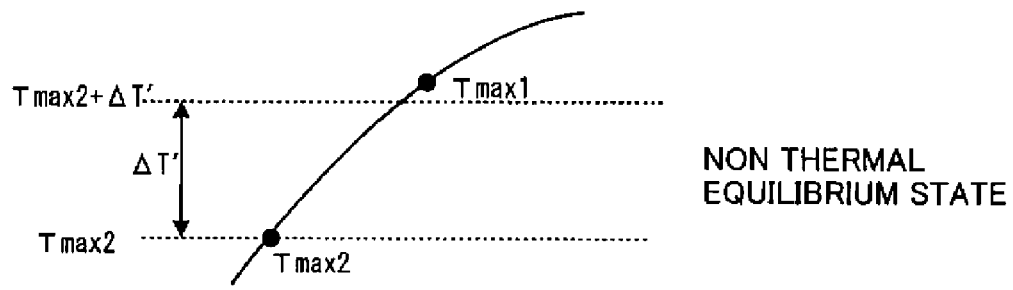

If it is not in the state reaching the thermal equilibrium, the new maximum value (Tmax1) is updated to be a larger value than the previous maximum value (Tmax2). Then, the new maximum value (Tmax1) is compared with the value (Tmax2+$\Delta T$') that is obtained by adding the set value $\Delta T$' to the previous maximum value (Tmax2). If (Tmax1) is larger than (Tmax2+$\Delta T$'), it is determined that it is not in the state reaching the thermal equilibrium, or the state has not attained the thermal equilibrium, and the operation returns to the step S21 to make a determination using a new maximum value (FIG. 8B). On this occasion, if the timer is already set, and MODE is "1" (S26), the timer is reset (S27) and MODE is set to "0" (S28). Thereafter, the operation returns to the step of S21 and a determination using a new maximum value is performed.

On the other hand, if the state is reaching the thermal equilibrium, the new maximum value (Tmax1) falls into the range between the previous maximum value (Tmax2) and a value (Tmax2+$\Delta T$') that is obtained by adding the set value $\Delta T$' to the previous maximum value (Tmax2). Therefore, the new maximum value (Tmax1) is compared with the range between the previous maximum value (Tmax2) and a value (Tmax2+$\Delta T$') that is obtained by adding the set value $\Delta T$' to the previous maximum value (Tmax2). If (Tmax1) is within the range between the previous maximum value (Tmax2) and (Tmax2+$\Delta T$'), it is determined that the state is reaching the thermal equilibrium (FIG. 8A)(S25).

In the step of S25, when it is determined that the state is reaching the thermal equilibrium, and the timer setting has not been performed yet (MODE="0") upon determination whether of not the time is already set (S29), the timer is set (S30) and the MODE is set to "1" (S31). Then, the operation returns to the step S21 and a determination using a new maximum value is made.

In the step of S25, when it is determined that the state is reaching the thermal equilibrium, and the timer is already set (MODE="1"), it is determined whether or not a predetermined period of time (ts) has elapsed from the time when the timer was set (S32). If the predetermined period of time (ts) has not elapsed yet, the operation returns to S21 and a determination is made using a new maximum value. If the predetermined period of time (ts) has elapsed, a switch control signal is outputted switching the display mode to the actual measured temperature display mode, as well as the maximum value data (Tmax1) is transmitted to the display means 5 (S33).

The display means includes a display unit 5b that displays the predicted temperature and the actual measured temperature (maximum temperature value), and a display switching unit 5a that controls the display unit 5b to switch the display from the predicted temperature display to the actual measured temperature (maximum temperature value).

It is further possible for the display unit 5b to display a status of displaying as appropriate, for the information such as being in the course of prediction, displaying the predicted temperature, and displaying the actual measured value not only above-mentioned predicted temperature and maximum temperature value.

A previous measured value is stored in the previous value storing means 7, and when the measurement is started, the previous measured value may be read out and displayed on the display unit 5b.

Figure 6:
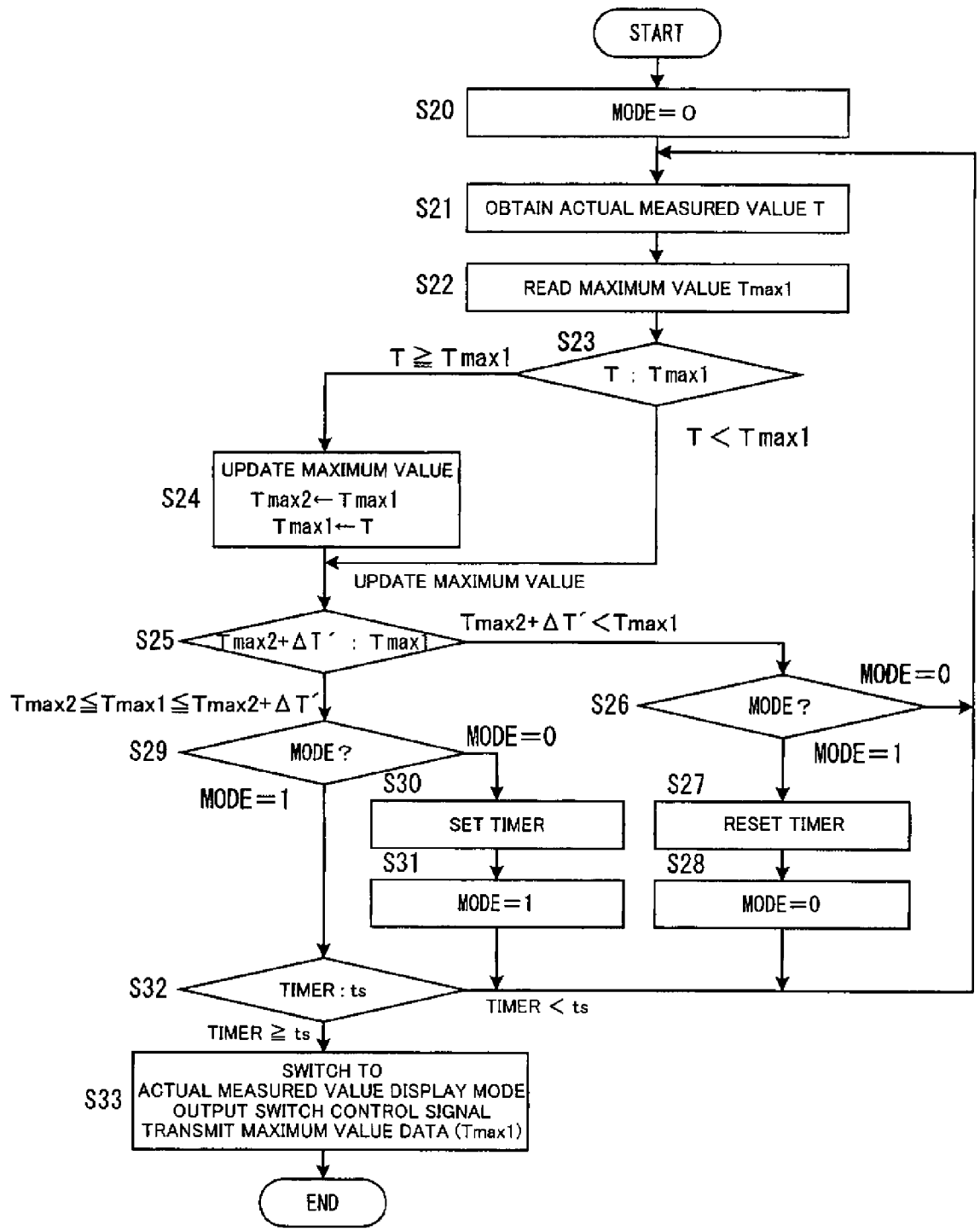
FIG. 6 is a flowchart to explain an operation example of a stability detection means according to the present invention.

In the flow of FIG. 6, an explanation has been made as to a case where the timer is used. However, if the timer is not used, the processes and determinations in the steps of S20, S26, S27, S28, S29, S30, S31, and S32 may be skipped in the flow shown in FIG. 6. In other words, in the determination in S25, if it is determined that the state is reaching the thermal equilibrium state, the processing in the step S33 is executed directly. On the other hand, if it is determined that the state is not reaching the thermal equilibrium state, the operation only returns to the step of S21.

Figure 9:
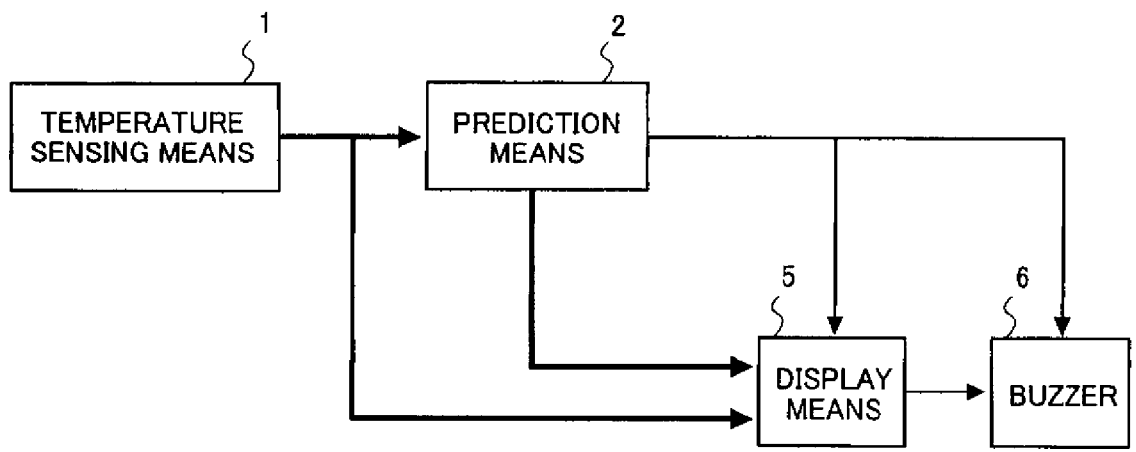
FIG. 9 is a diagram to explain a schematic configuration of another aspect of the electronic thermometer according to the present invention.

Next, another aspect of the electronic thermometer according to the present invention will be explained. The aspect of the electronic thermometer explained here is directed to a function of switching of temperature display by the display means from the predicted temperature to the actual measured temperature, based on a variation state of a peak value of the actual measured temperature. FIG. 9 is a diagram to explain a schematic configuration of this second aspect of the electronic thermometer according to the present invention.

The electronic thermometer includes a temperature sensing means 1 for sensing a temperature of a part to be measured, a prediction means 2 for calculating a temperature on thermal equilibrium by using the actual measured temperature sensed by the temperature sensing means 1, a display means 5 for switching the display from the predicted temperature predicted by the prediction means 2 to the actual measured temperature sensed by the temperature sensing means 1, and a buzzer 6 for notifying by sound that the predicted temperature is displayed, or that the display is switched from the predicted temperature to the actual measured temperature.

Figure 10:
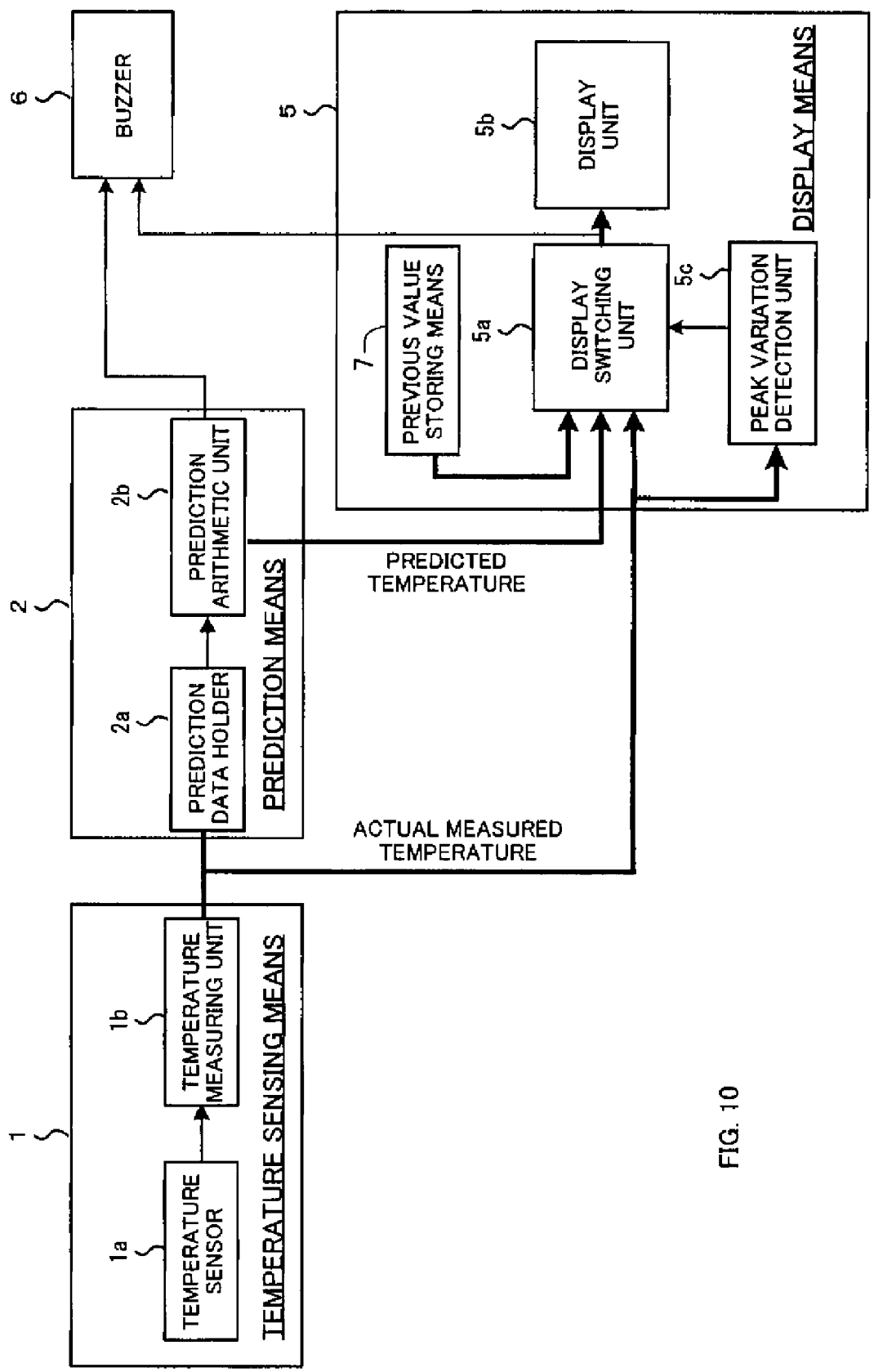
FIG. 10 is a diagram to explain a configuration example of another aspect of the electronic thermometer according to the present invention.

FIG. 10 is a diagram to explain a more detailed configuration example of the aspect of the invention shown in FIG. 9.

Figure 5:
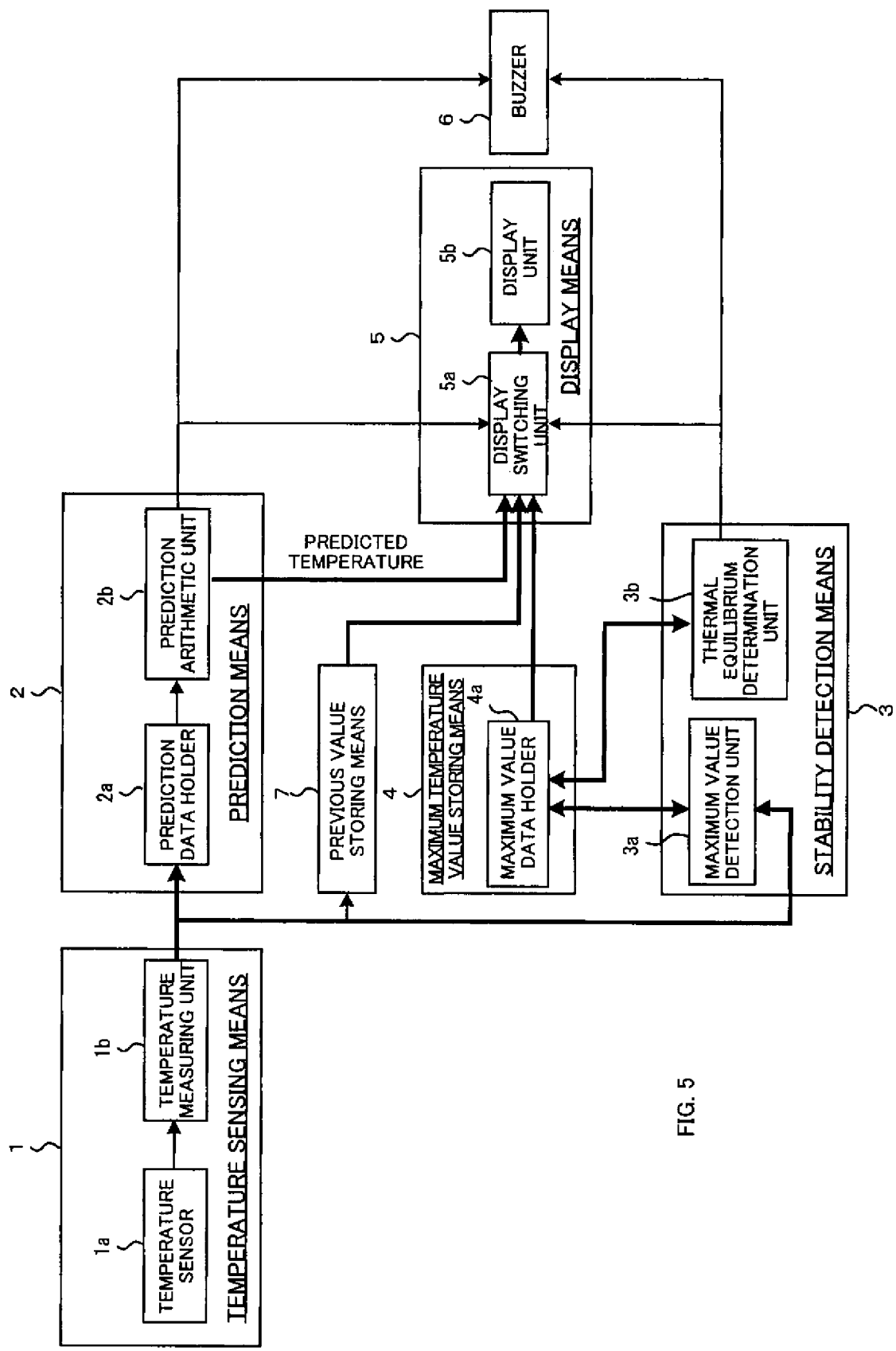
FIG. 5 is a diagram to explain a configuration example of the electronic thermometer according to the present invention.

The temperature sensing means 1 and the prediction means 2 may have the same configuration as the configuration shown in FIG. 5 as mentioned above.

The temperature sensing means 1 includes a temperature sensor 1*a* for measuring a temperature of a part to be measured, and a temperature measuring unit 1*b* that converts a sensed signal outputted from the temperature sensor 1*a* into a temperature signal, and outputs the temperature signal as the actual measured temperature. The temperature measuring unit 1*b* is provided with an A/D converter, and the actual measured temperature is outputted in a digital value.

The prediction means 2 includes a prediction data holder 2*a* that holds temperature data used for calculating the predicted temperature and an elapsed time from the start of measuring, and a prediction arithmetic unit 2*b* that computes and calculates the predicted temperature by using the temperature data held by the prediction data holder 2*a*. The prediction arithmetic unit 2*b* is provided with an arithmetic formula to calculate the predicted temperature, and by applying the temperature data to the arithmetic formula, the predicted temperature after a predetermined period of time (for example, 10 minutes later) is calculated.

The display means 5 includes a display unit 5*b* for displaying various contents regarding the electronic thermometer, other than the temperature display, a display switching unit 5*a* for switching the temperature displayed on the display unit 5*b* from the predicted temperature to the actual measured temperature, and a peak variation detection unit 5*c* for detecting a variation state of a peak value of the actual measured temperature.

The peak variation detection unit 5*c* holds a peak value of the actual measured temperature, and detects a variation of the peak value. The peak variation detection unit 5*c* detects, for example, whether or not a variation range of the peak hold value of the actual measured temperature falls within a predetermined range. It is possible to determine whether or not the variation range of the peak hold value falls within the predetermined range, by finding whether or not the increase ratio of the peak hold value falls within a predetermined range.

The display switching unit 5*a* switches the display of the temperature on the display unit 5*b* from the predicted temperature to the actual measured temperature, when the variation range of the peak hold value of the actual measured temperature detected by the peak variation detection unit 5*c* falls within a predetermined range, in other words, when the increase rate of the peak hold value of the actual measured temperature falls in a predetermined range of values. It is to be noted here that the increase rate of the peak hold value of the actual measured temperature can be defined by a rising value of the peak hold value with respect to a predetermined time zone. When the increase rate falls within a predetermined value, a rise of the actual measured temperature is small, indicating that the measured temperature is in equilibrium state.

According to the configuration above, it is possible to omit the configurations of the maximum temperature value storing means and the stability detection means provided in the aforementioned aspect of the invention.

It is to be noted that the display means 5 may include the previous value storing means 7 for storing a previous measured value, and when the measurement is started, a previous measured value may be read out and displayed on the display unit 5*b*.

Figure 11:
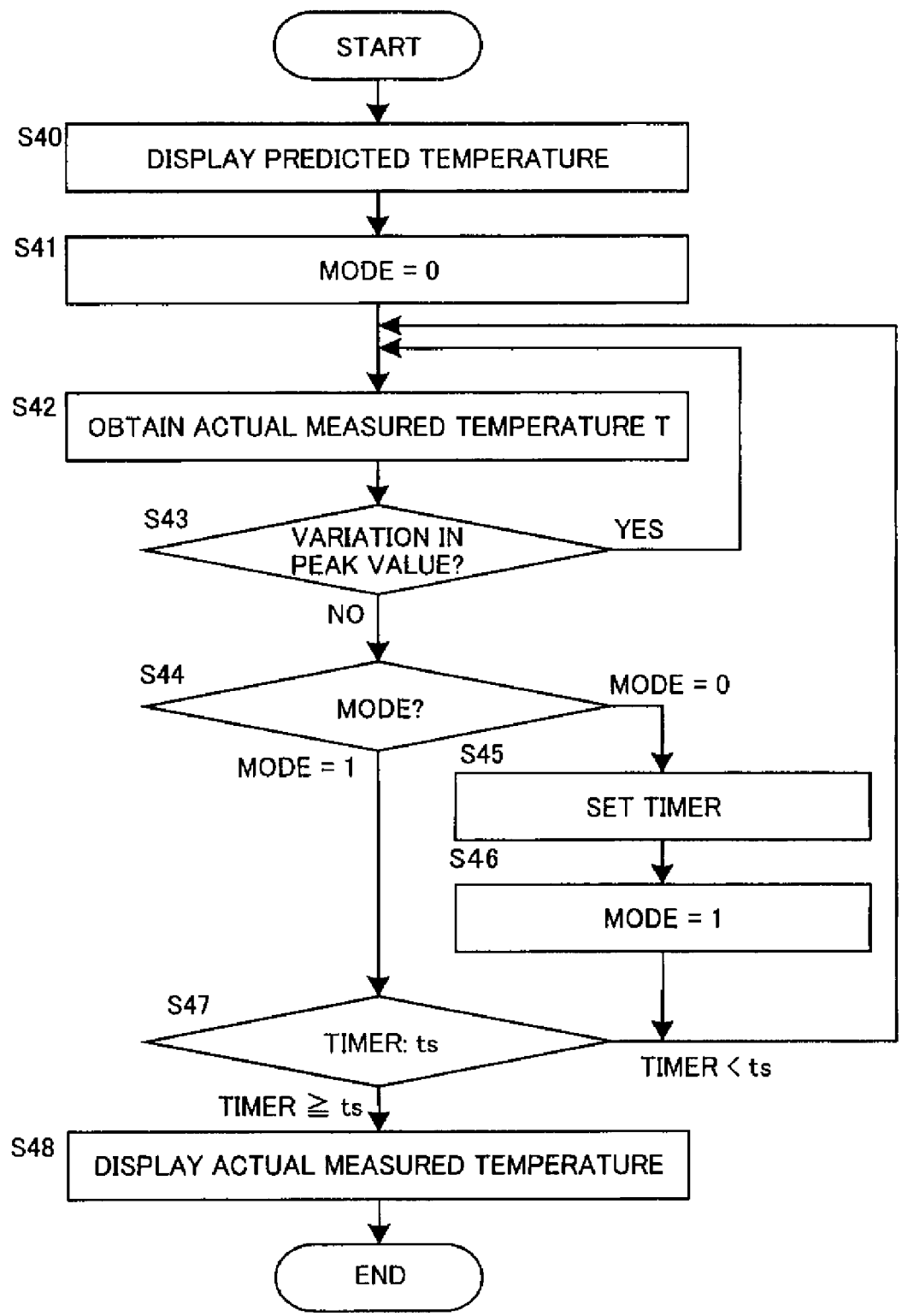
FIG. 11 is a chart to explain an operation example of the display means of another aspect of the electronic thermometer according to the present invention.
Figure 12A:
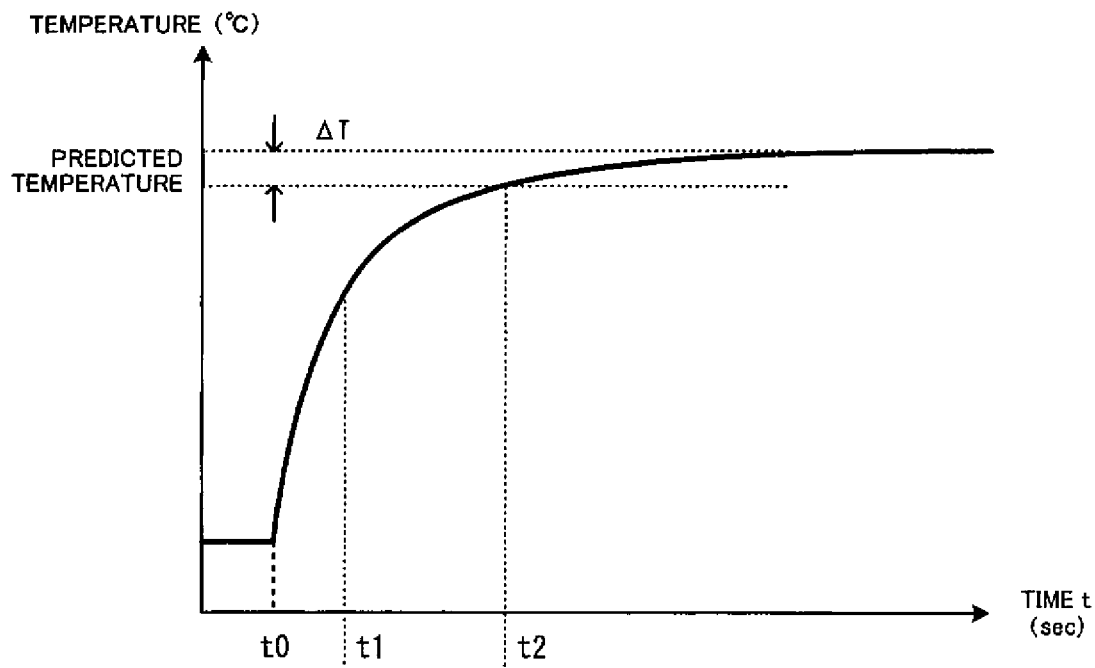
FIG. 12 shows charts to explain the display switching from the predicted temperature to the actual measured temperature.
Figure 12B:
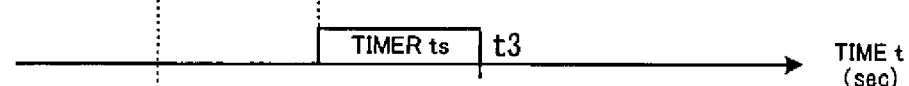
Figure 12C:
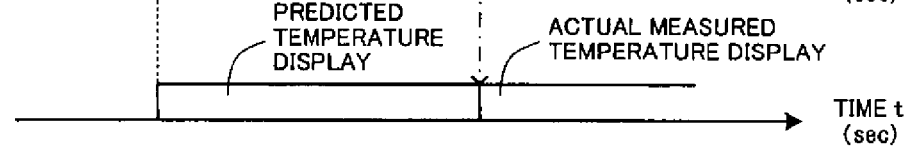
Figure 12D:
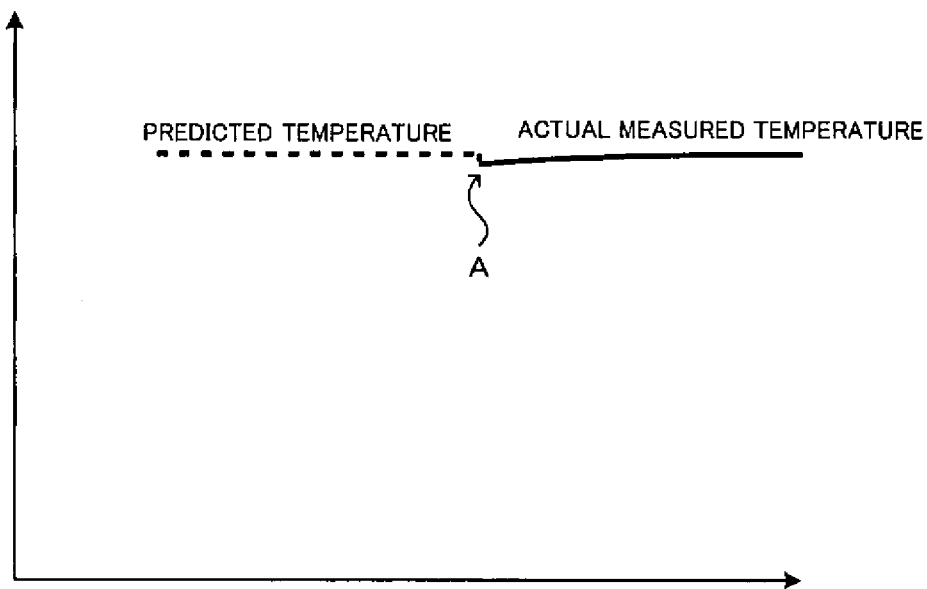
Figure 13A:
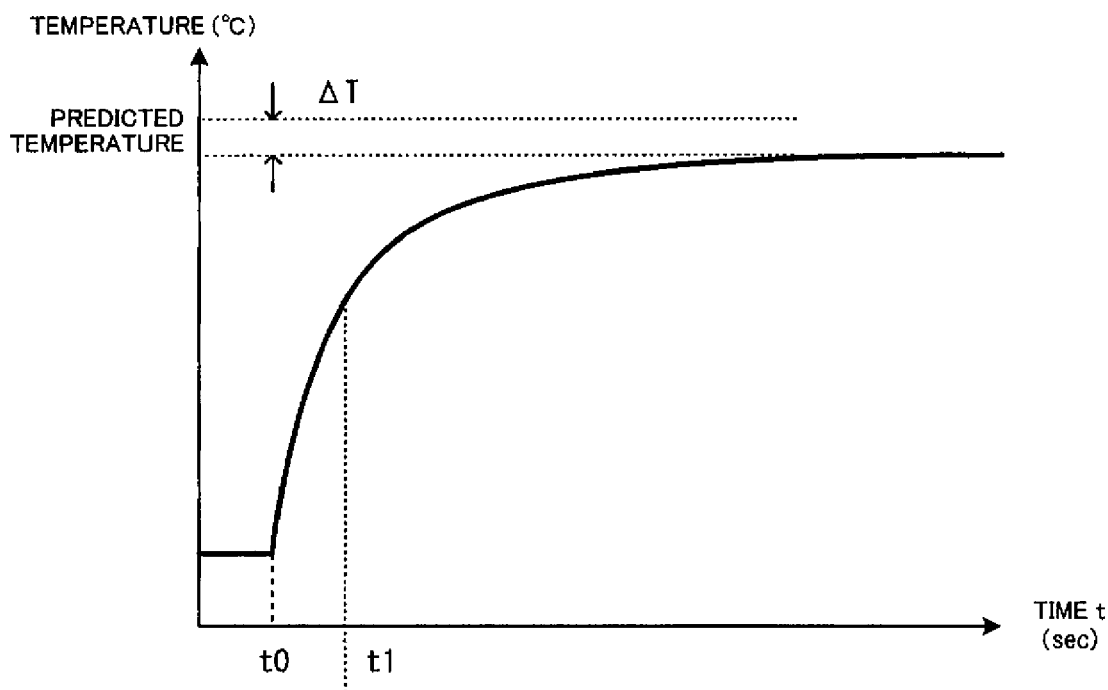
FIG. 13 shows charts to explain a display state where the predicted temperature is set significantly higher than an actual body temperature.
Figure 13B:
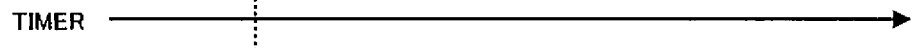
Figure 13C:
Figure 13D:
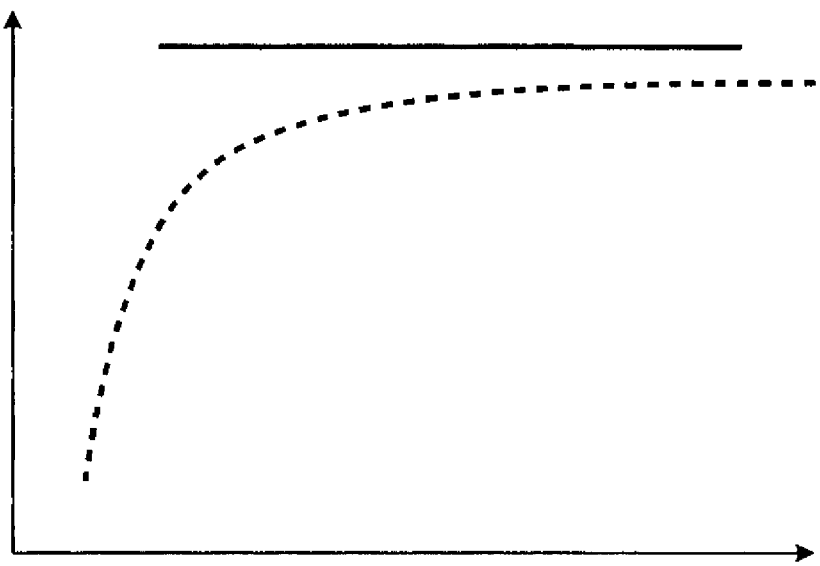

With reference to the flowchart shown in FIG. 11, an operation example of the display means according to another aspect of the electronic thermometer of the present invention will be explained.

A predicted temperature from the prediction means is inputted in the display switching unit 5*a* as well as an actual measured temperature from the temperature detection means 1. Firstly, the display switching unit displays the predicted temperature (S40), and sets the flag MODE for timer setting and timer resetting to "0". Here, the flag MODE "0" indicates that the timer is in the state where the setting is not performed yet, and the flag MODE "1" indicates that the timer is in the state where the setting is already performed (S41).

The peak variation detection unit 5*c* sequentially obtains the actual measured temperature and holds a peak value (S42), the actual measured temperature and holds a peak value (S42), and monitors the variation of the peak value. Here, monitoring of the peak value variation can be performed by determining whether or not the rising value of the peak hold value within a predetermined time zone goes over a predetermined value (S43).

In the step of S43, if it is detected that the rising value of the peak hold value does not go over the predetermined value, and the peak value variation is within a predetermined range, the actual measured temperature is determined to be in equilibrium state.

Here, when the flag MODE is set to "0", and the setting of the timer has not been performed yet (S44), the timer is set (S45), and the flag MODE is set to "1" (S46). Then, the operation returns to the step of S42 to time how long the actual measured temperature is in equilibrium state.

On the other hand, in the step of S44, if the flag MODE for timer resetting is set to "1" and the period how long the actual measured temperature is in equilibrium state is timed, the time of the timer is compared with the set value ts. Consequently, if the period when the actual measured temperature is in equilibrium state goes over the set value ts, the actual temperature is displayed instead of the predicted temperature (S48).

If the period when the actual measured temperature is in equilibrium state does not go over the set value ts, the operation returns to the step of S42, and the period how long the actual measured temperature is in equilibrium state is timed.

What is claimed is:

1. An electronic thermometer comprising:
    a temperature sensing means for sensing a temperature of a part to be measured,
    a maximum temperature value storing means for storing a maximum temperature value of the temperature being sensed,
    a prediction means for predicting an equilibrium temperature by using the temperature being sensed, and
    a temperature display means having a temperature display unit,
    wherein the temperature display means switches a display of the temperature display unit from the display of the equilibrium temperature being predicted by the prediction means to the display of the maximum temperature value, based on a determination of whether there is a change for a predetermined period of time in the maximum temperature value stored in the maximum temperature value storing means, when there is no change for a predetermined period of time in the maximum temperature value stored in the maximum temperature value storing means, and when a new maximum temperature value stored in the maximum temperature value storing means falls within a range between an old maximum temperature value a predetermined period of time before and a temperature value obtained by adding a predetermined temperature to the old maximum temperature value.

* * * * *